US 8,482,167 B2

(12) United States Patent
Erfanfar et al.

(10) Patent No.: US 8,482,167 B2
(45) Date of Patent: Jul. 9, 2013

(54) MODES OF COOLING HYBRID ELECTRIC MACHINES

(75) Inventors: Mohsen Erfanfar, Carmel, IN (US); Edward Bass, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 13/213,252

(22) Filed: Aug. 19, 2011

(65) Prior Publication Data

US 2012/0001504 A1 Jan. 5, 2012

Related U.S. Application Data

(63) Continuation of application No. PCT/US2011/042332, filed on Jun. 29, 2011.

(60) Provisional application No. 61/360,683, filed on Jul. 1, 2010.

(51) Int. Cl.
*H02K 11/00* (2006.01)
*H02K 9/28* (2006.01)
*H02K 9/00* (2006.01)

(52) U.S. Cl.
USPC .................. 310/52; 310/54; 310/59; 310/64; 310/58; 310/53

(58) Field of Classification Search
USPC .......................................... 310/52, 54, 59, 63
See application file for complete search history.

(56) References Cited

U.S. PATENT DOCUMENTS

| 2,074,067 | A | | 3/1937 | Darnell |
| 3,939,907 | A | * | 2/1976 | Skvarenina .................. 165/86 |
| 4,894,573 | A | * | 1/1990 | Simpson ............... 310/216.124 |
| 5,363,002 | A | | 11/1994 | Hernden et al. |
| 5,365,132 | A | | 11/1994 | Hann et al. |
| 5,491,371 | A | | 2/1996 | Ooi |
| 5,519,269 | A | | 5/1996 | Lindberg |
| 5,859,483 | A | | 1/1999 | Kliman et al. |
| 6,201,365 | B1 | * | 3/2001 | Hara et al. ................... 318/558 |
| 6,680,550 | B2 | * | 1/2004 | Matsunaga et al. ............ 310/58 |
| 6,700,287 | B2 | * | 3/2004 | Ohmura et al. ........ 310/216.008 |
| 6,836,051 | B2 | * | 12/2004 | Hiwaki et al. ............. 310/254.1 |
| 6,954,010 | B2 | * | 10/2005 | Rippel et al. ................ 310/60 A |

(Continued)

FOREIGN PATENT DOCUMENTS

| JP | 01259740 | * 10/1989 |
| JP | 7185994 A | 7/1995 |

(Continued)

OTHER PUBLICATIONS

Machine translation of JP2008178243, Awata, Jul. 2008.*

(Continued)

*Primary Examiner* — Tran Nguyen
*Assistant Examiner* — Terrance Kenerly
(74) *Attorney, Agent, or Firm* — Woodard, Emhardt, Moriarty, McNett & Henry LLP

(57) ABSTRACT

A system and method for cooling an electric motor comprising a plurality of laminations defining a lamination stack, a coolant passage and a motor winding. Coolant is pumped into the coolant passage and forced along the entire length of the lamination stack. The coolant is then sprayed on the motor winding in order to cool the motor winding.

19 Claims, 11 Drawing Sheets

U.S. PATENT DOCUMENTS

| | | | |
|---|---|---|---|
| 7,002,267 B2 | 2/2006 | Raszkowski et al. | |
| 7,009,317 B2 | 3/2006 | Cronin et al. | |
| 7,284,314 B2 * | 10/2007 | Niimi et al. | 29/596 |
| 7,307,363 B2 | 12/2007 | Pashnik et al. | |
| 7,530,156 B2 | 5/2009 | Rippel et al. | |
| 7,839,031 B2 * | 11/2010 | Tilton et al. | 310/54 |
| 8,164,225 B2 * | 4/2012 | Maduskuie et al. | 310/59 |
| 2003/0102728 A1 * | 6/2003 | Chen et al. | 310/52 |
| 2004/0119367 A1 * | 6/2004 | Hiwaki et al. | 310/216 |
| 2005/0189826 A1 | 9/2005 | Tilton et al. | |
| 2005/0206252 A1 * | 9/2005 | Georg et al. | 310/59 |
| 2006/0026820 A1 * | 2/2006 | Rippel et al. | 29/609 |
| 2006/0066159 A1 | 3/2006 | Enomoto et al. | |
| 2007/0035187 A1 | 2/2007 | Verhaegen | |
| 2008/0100159 A1 | 5/2008 | Dawsey et al. | |
| 2008/0136271 A1 | 6/2008 | Alfermann et al. | |

FOREIGN PATENT DOCUMENTS

| | | |
|---|---|---|
| JP | 9154257 A | 6/1997 |
| JP | 10-501399 | 2/1998 |
| JP | 11069721 * | 3/1999 |
| JP | 2007325358 A | 12/2007 |
| JP | 2008178243 * | 7/2008 |
| JP | 2009284603 A | 12/2009 |
| WO | WO 95/34936 | 12/1995 |

OTHER PUBLICATIONS

Machine translation of JP11069721, Matsumoto, Mar. 1999.*

Translation of JP 01259740, Nakamura et al., Oct. 1989.*

International Search Report from Korean Intellectual Property Office in related PCT Application No. PCT/US2011/042332 dated Feb. 17, 2012.

Written Opinion from Korean Intellectual Property Office in related PCT Application No. PCT/US2011/042332 dated Feb. 17, 2012.

* cited by examiner

MODES OF COOLING HYBRID ELECTRIC MACHINES

REFERENCE TO RELATED APPLICATIONS

This application is a continuation of International Patent Application No. PCT/US2011/042332 filed Jun. 29, 2011, which claims the benefit of priority of U.S. Provisional Patent Application Ser. No. 61/360,683 filed Jul. 1, 2010, which are hereby incorporated by reference in their entirety.

BACKGROUND

The present invention relates to a system and method for cooling an electric motor, and, more particularly, to a system and method for cooling the stator and stator windings of an electric motor for use in hybrid electric vehicles.

Electric motors, also referred to as E-machines, are commonly used in hybrid electric vehicles. Many of these motors include an interior rotor that rotates within an exterior stationary stator. The stator is often constructed of a plurality of stacked laminations (i.e., lamination stack) which support a plurality of stator windings.

These electric motors generate a considerable amount of heat during operation. If the heat is not adequately dissipated, the performance and reliability of the motors may be impaired. Early systems incorporated air cooling techniques to remove and dissipate the heat from the electric motor. Those air cooled arrangements were generally acceptable if the volume or size of the electric motor was large. However, the incorporation of E-machines in cars, trucks and other mobile vehicles makes their size and weight an important design concern. As the E-machines become smaller and more power dense, they become difficult to cool by air alone.

These design concerns led to the development of liquid cooling systems. However, these cooling systems have their own setbacks. Many of the known liquid cooling techniques utilize complex systems which require additional components to be installed in or around the electrical machine. Such designs result in additional manufacturing costs and processing time. More importantly, these complex systems also increase the overall weight of the E-machine. In the context of hybrid electric vehicles, an increase in weight often leads to a decrease in overall vehicular power and/or fuel efficiency.

Thus, there is a need for improvement in this field.

SUMMARY

The present invention provides an improved system and method for cooling an electric motor.

According to one aspect of the present disclosure, method for cooling an electric motor comprising a plurality of laminations defining a lamination stack, a coolant passage and a motor winding. Coolant is pumped into the coolant passage and forced along the entire length of the lamination stack. The coolant is then sprayed on the motor winding in order to cool the motor winding.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
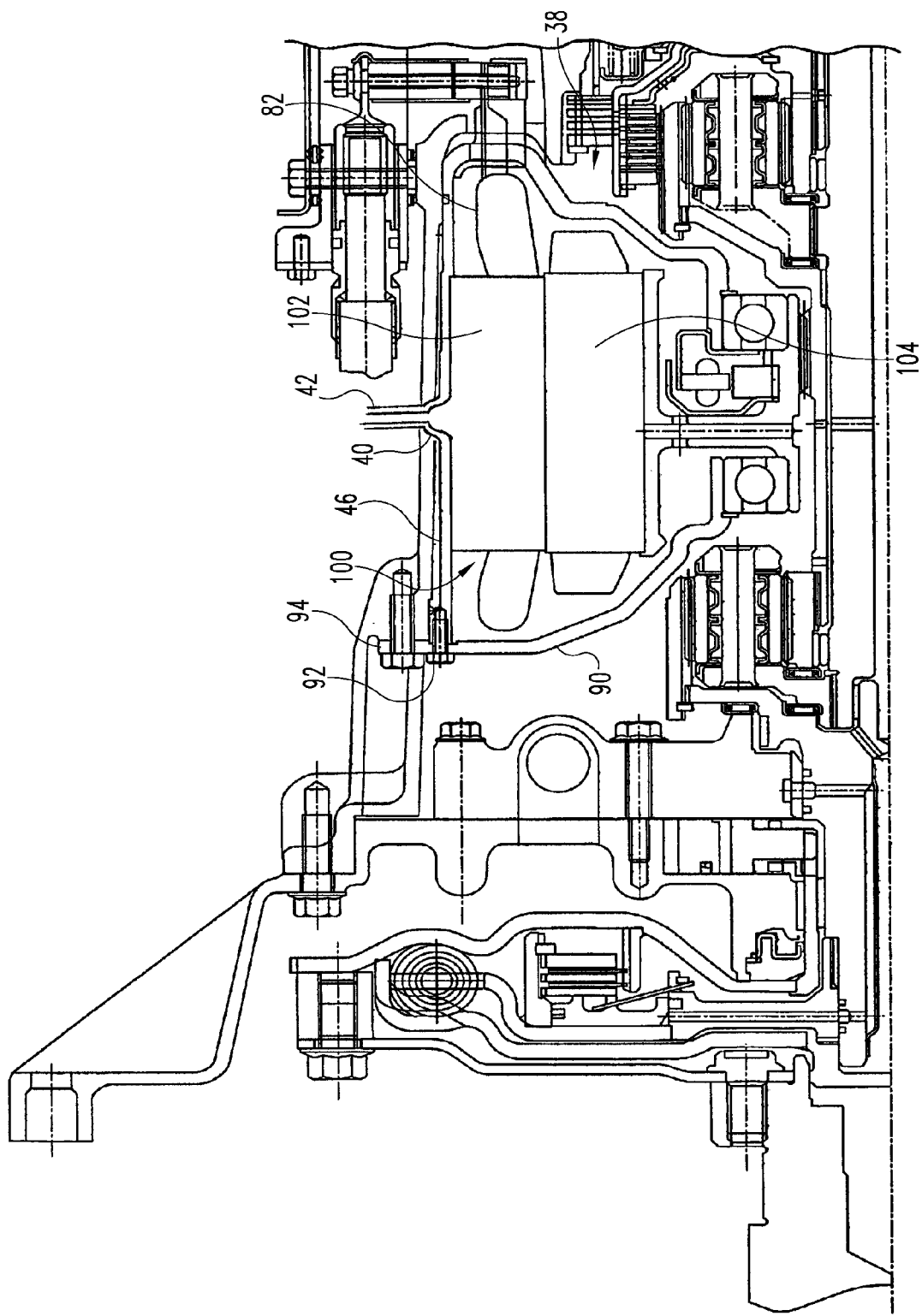
FIG. 1 is a partial diagrammatic cross-sectional view of a hybrid electro-mechanical transmission utilizing one embodiment of the disclosed motor cooling arrangement.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The present disclosure generally concerns an improved system and method for cooling the stator lamination stack and stator windings of an electric motor. More specifically, certain embodiments of the present disclosure provide a cooling system in which the coolant flows through the stator core and sprays on the stator windings, thereby cooling both.

Referring now to the drawings, FIG. 1 depicts the upper half of a vehicular transmission. Though figure numerals are not provided as they are not important to the present disclosure, those of ordinary skill will appreciate that FIG. 1 further depicts various clutches, gears, torsion dampers, etc. typically found around a vehicular transmission. Relevant to the present discussion, a motor housing 38 is constructed and arranged to enclose an electric motor 100. Electric motor 100 includes stator 102 and rotor 104. As shown, the stator 102 includes stator windings 82. Coolant is introduced into motor housing 38 via inlet 42. A coolant channel 40 is provided on the upper surface of motor housing 38 and is in fluid connection with inlet 42.

In the illustrated embodiments, a housing cover 90 is bolted to the open end of the motor housing 38 with bolts 92 so that the housing cover 90 is removable. In other embodiments, housing cover 90 is attached to motor housing 38 through other conventional manners. Housing cover 90 further includes a plurality of mounting tabs 94 radially spaced around the cover 90. The mounting tabs 94 allow the motor housing 38 and enclosed motor 100 to be easily attached to the appropriate engine component, i.e., transmission housing.

Figure 2:
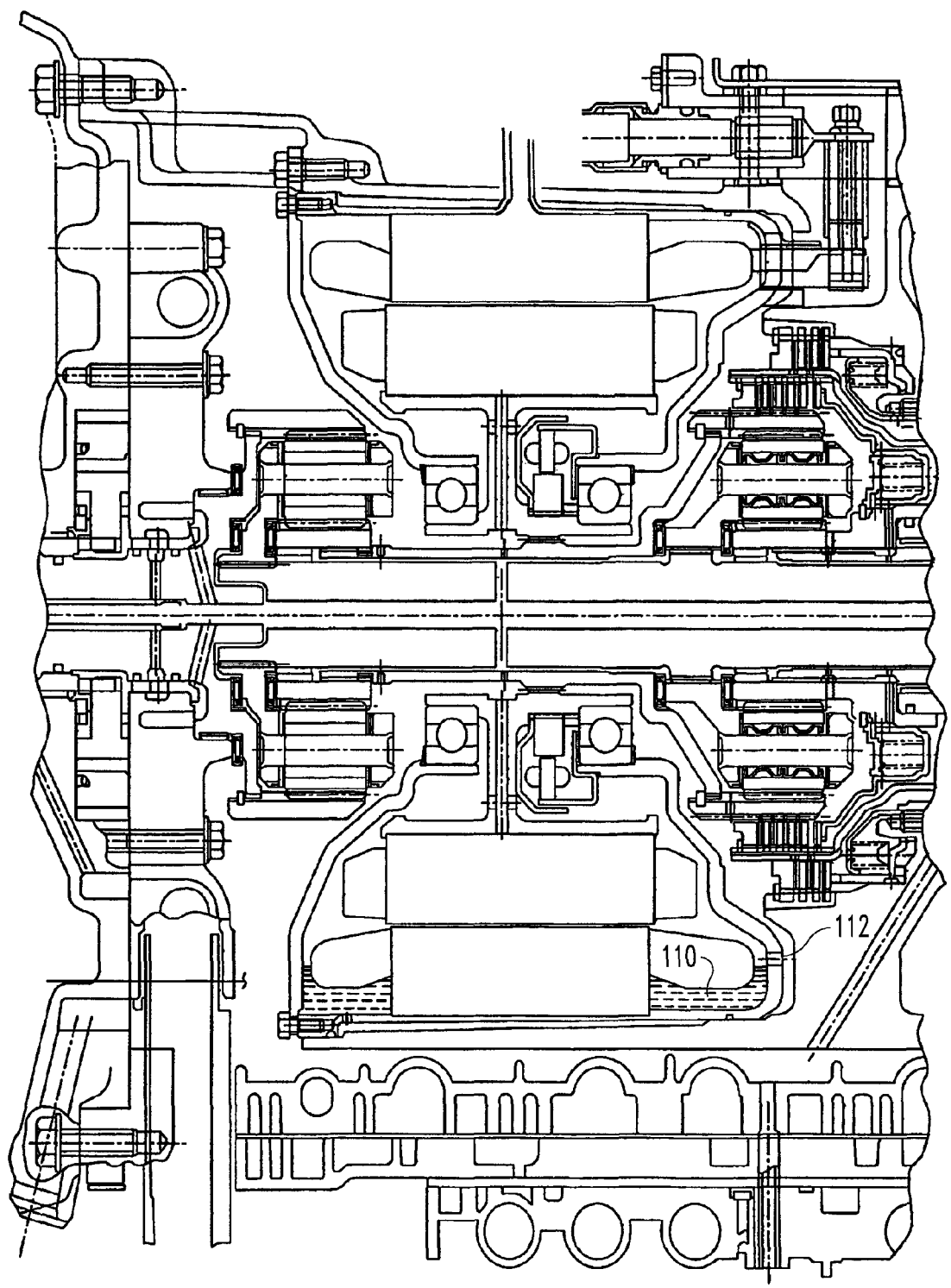
FIG. 2 is a diagrammatic cross-sectional view of a hybrid electro-mechanical transmission utilizing one embodiment of the disclosed motor cooling arrangement.
Figure 3:
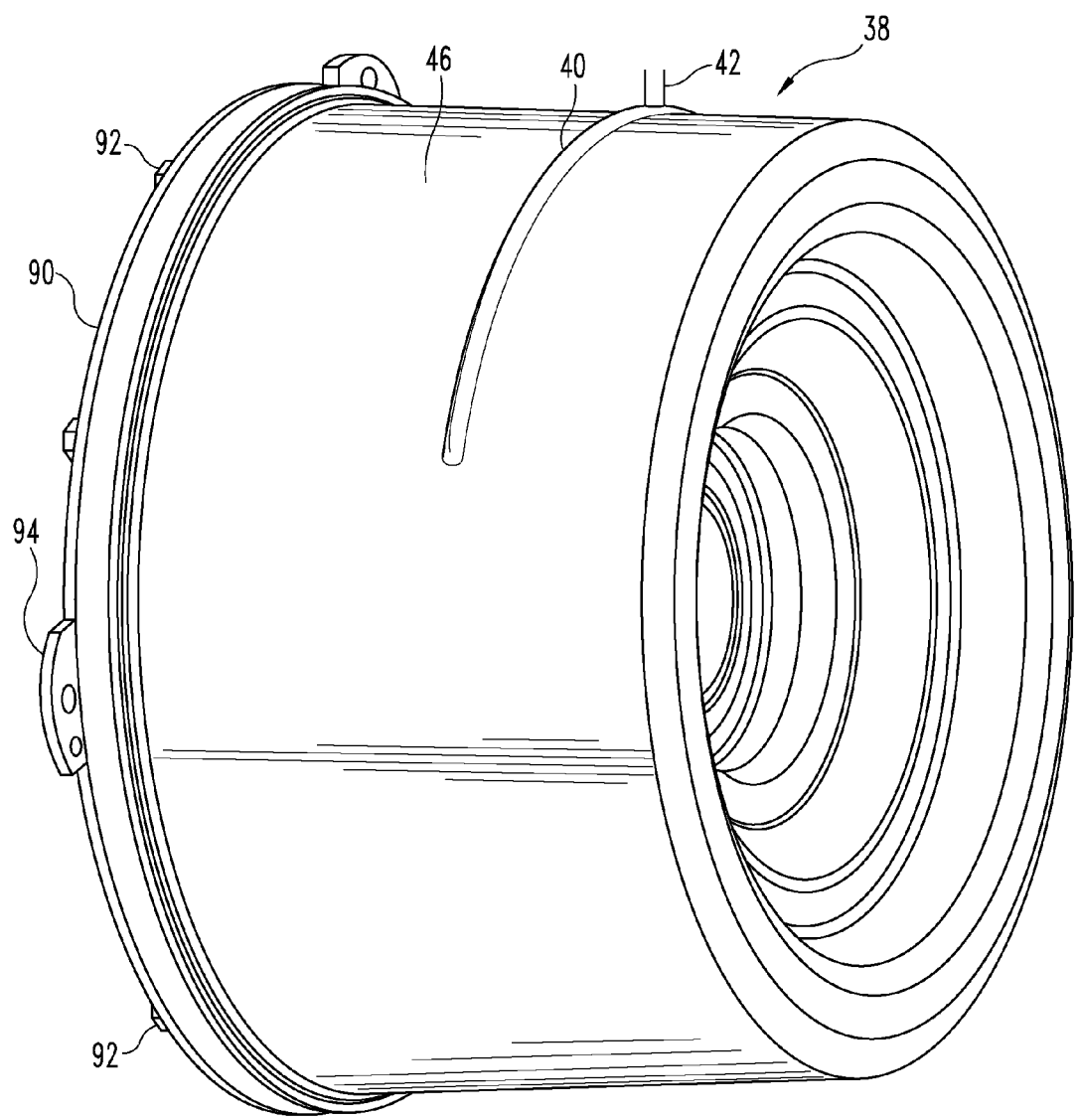
FIG. 3 is a perspective view of a housing for an electrical motor according to one aspect of the present invention.

As shown in FIG. 2, motor housing 38 may also include a drain outlet 112. As will be explained in more detail herein below, coolant is provided to the stator core via inlet 42 and coolant channel 40. The pressurized coolant will be forced toward both ends of the stator 102 and will be sprayed upon the stator windings 82. Naturally, gravity will pull the coolant down to the bottom of the motor housing 38. In the illustrated embodiment, the accumulated coolant 110 introduced into the motor housing 38 via inlet 42 collects at the bottom of housing 38 until the coolant level reaches drain outlet 112. The location of the drain outlet 112 dictates the amount of coolant accumulated and, therefore, can be positioned at different locations depending on the particular design parameters for the desired application. In another embodiment, the drain outlet is placed on the bottom of motor housing 38 in order for the coolant to be immediately withdrawn from motor housing 38. From there, the removed coolant can either be directed to other components of the vehicle (such as clutches, gears, transmission, drive unit, etc.) or sent directly to a heat exchanger to be cooled. FIG. 3 provides an isolated, perspective view of motor housing 38. As noted above, coolant is introduced into motor housing 38 via inlet 42. The coolant is then fed into the stator core by coolant channel 40. As shown, coolant channel 40 is provided on the upper surface of motor housing 38. It should be appreciated that the amount of coolant is, at least in part, dictated by the length of coolant channel 40. In the depicted embodiment, coolant channel 40 only extends down a portion of motor housing 38. In another embodiment, coolant channel 40 extends completely around motor housing 38.

Figure 4:
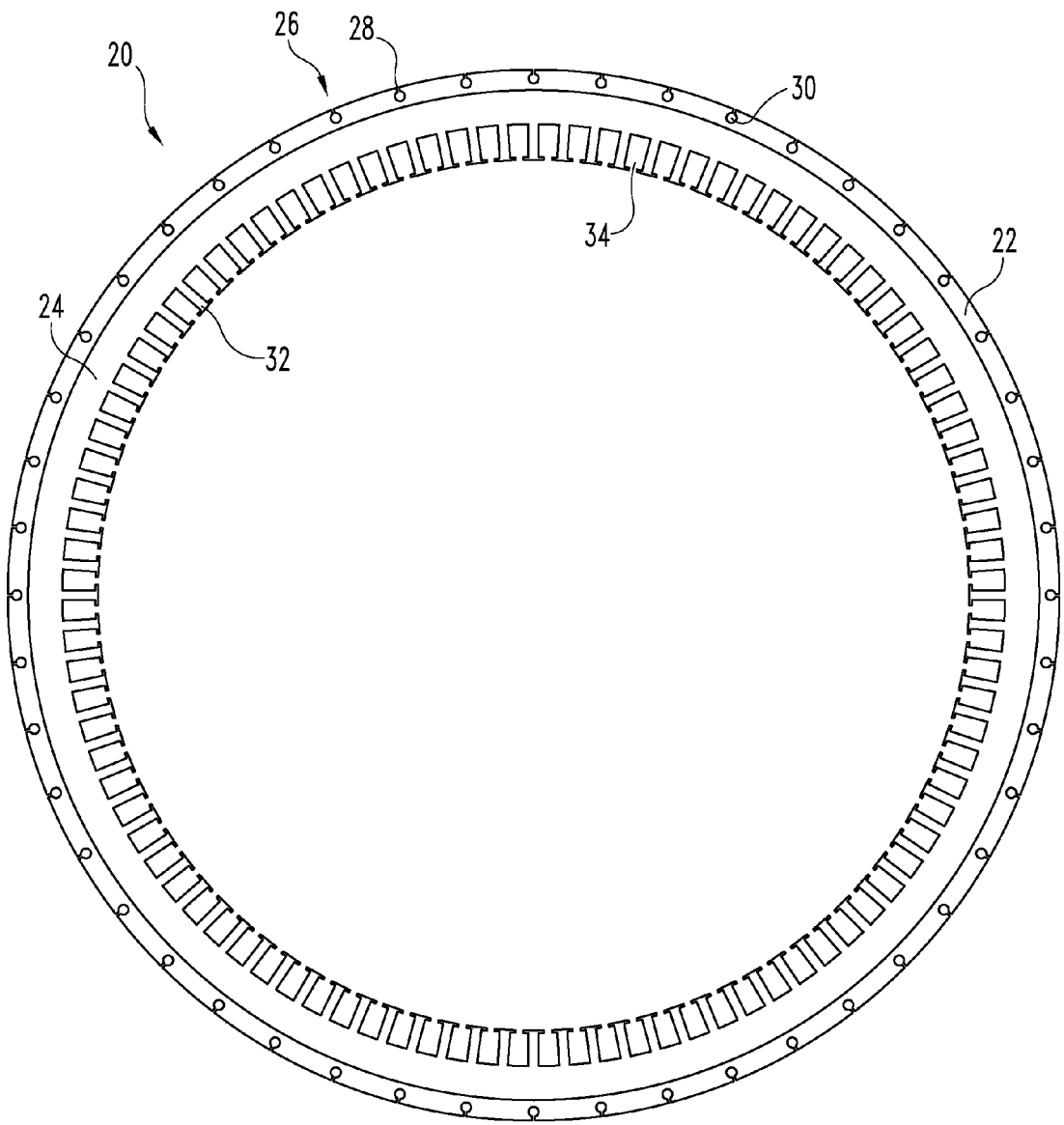
FIG. 4 is an end view of a single lamination according to one embodiment of the present disclosure.

As noted above, the electric motor includes a stationary stator. The stator is made up of a plurality of individual laminations which are stacked together. FIG. 4 depicts an individual lamination 20 according to one embodiment of the present disclosure. As shown, lamination 20 has an area around its outer peripheral generally defining a back iron area 22 and the inward portion of the lamination 20 generally defining a lamination core 24. The back iron area 22 of lamination 20 includes a plurality of apertures 26. Each aperture 26 includes an entrance slot 28 and cooling hole 30. As shown, entrance slot 28 provides a communicative connection for cooling hole 30 with the area outside of lamination 20. The inner portion of lamination core 24 includes a plurality of winding teeth 32 which define a plurality of winding slots 34. Stator windings are wrapped around winding slots 34 and supported by winding teeth 32 in a conventional manner.

To form a lamination stack, a plurality of individual laminations 20 are stacked and bonded together. In one embodiment, laminations are bonded to one another through the use of a bonding adhesive or agent. In another embodiment, the individual laminations are bonded or affixed to one another through a mechanical connection.

Figure 5:
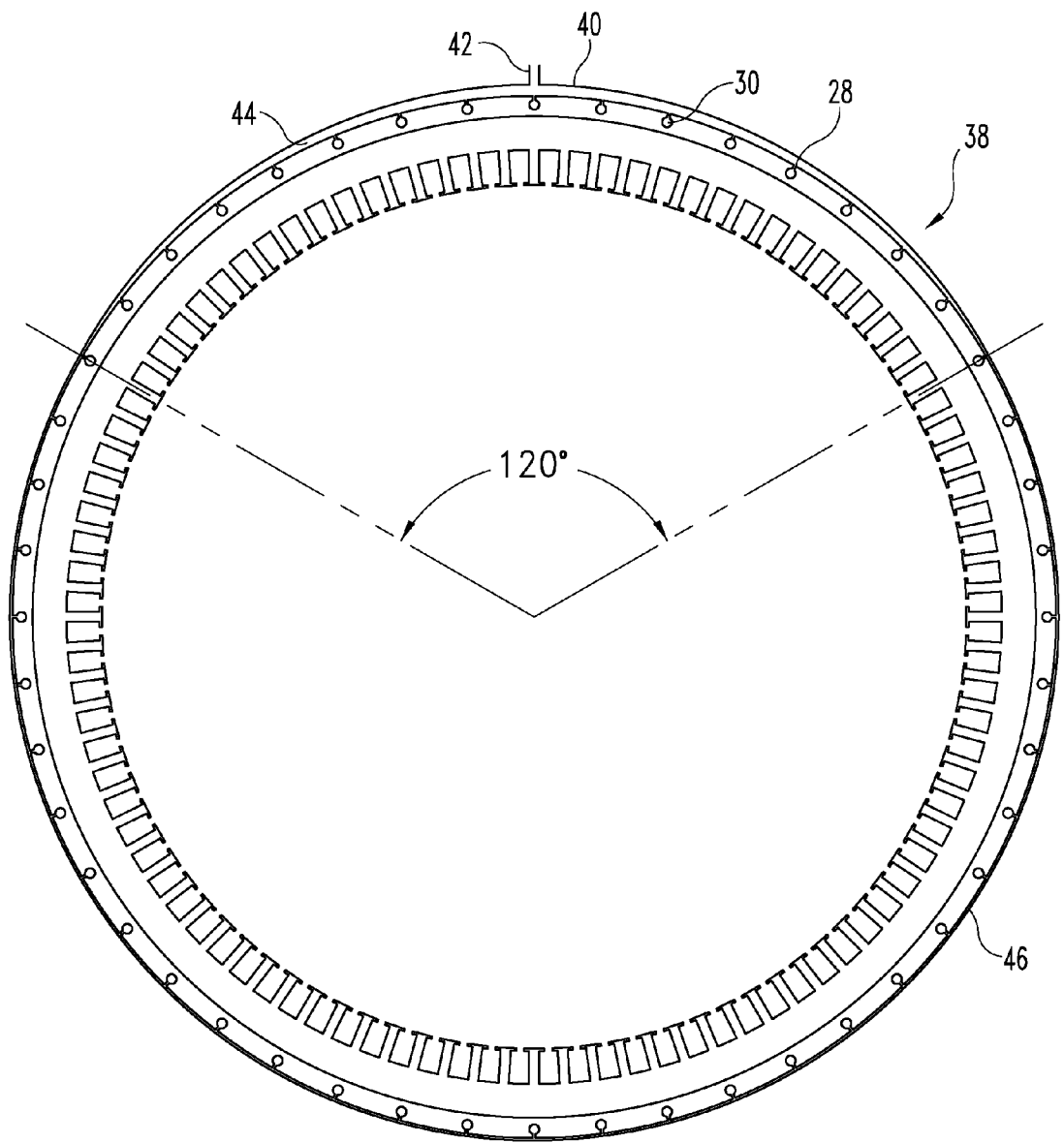
FIG. 5 is a cross-sectional end view of a motor cooling arrangement according to one embodiment of the present disclosure.
Figure 6:
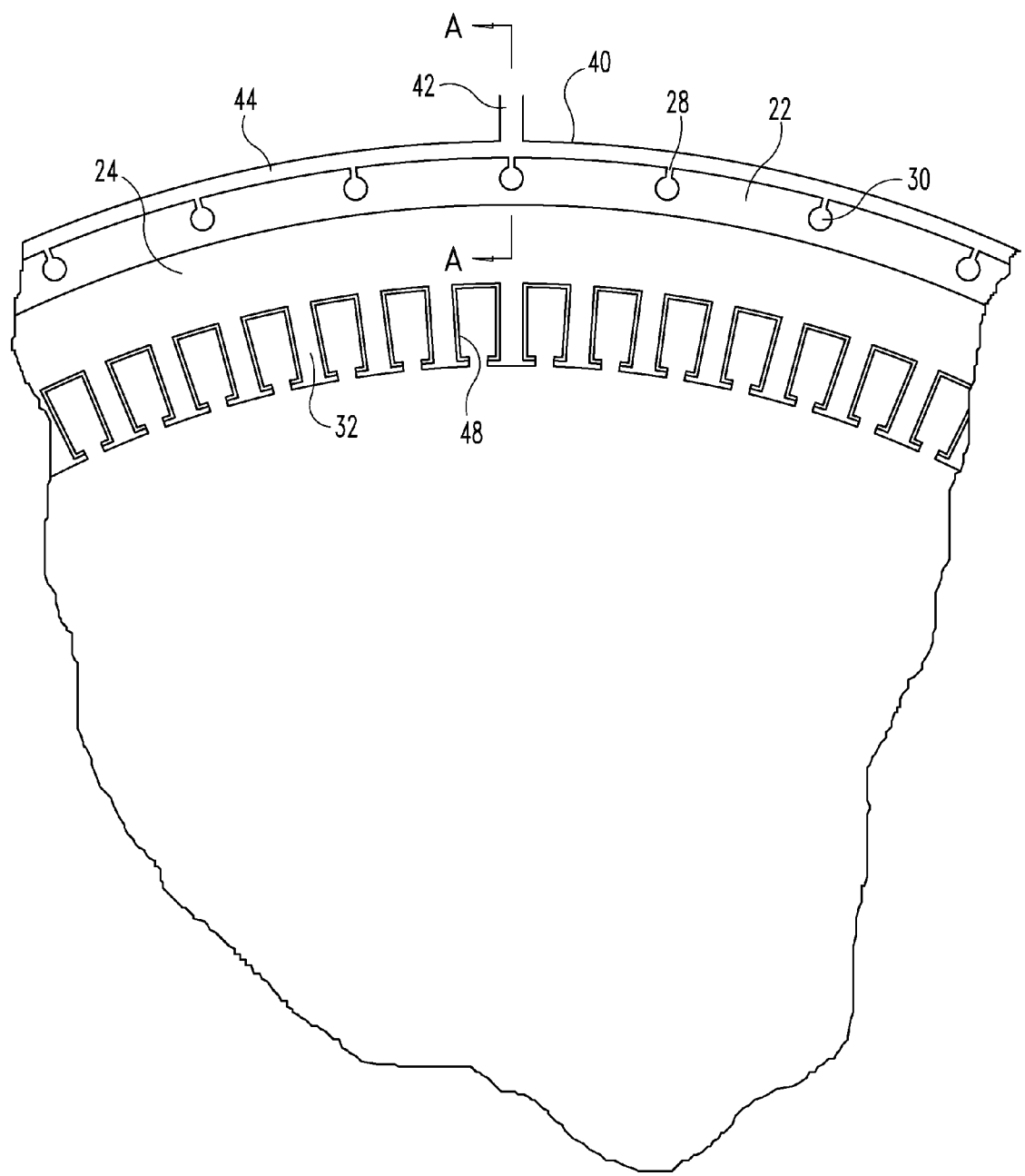
FIG. 6 is a partial cross-sectional end view of a motor cooling arrangement according to one embodiment of the present disclosure.

Referring now to FIGS. 5 and 6, the lamination stack is enclosed by motor housing 38. As explained above, motor housing 38 includes a raised portion which defines a coolant channel 40. The coolant channel 40 may be formed into housing 38 through known techniques, for example, but not limited to, molding or machining.

The coolant channel 40 is in communicative and fluid connection with an inlet port 42. The coolant channel 40 is dimensioned to define a coolant introduction area 44 above the back iron 22 of lamination 20. Inlet port 42 provides a passage for liquid or fluid coolant to enter the motor housing 38, and more particularly, coolant introduction area 44. The coolant introduction area 44 provides a space for coolant to be introduced through entrance slot 28 and into coolant hole 30.

In the shown embodiment, the coolant introduction area 44 is positioned at the top 120° portion of coolant channel 40. However, coolant channel 40 can be designed to cover a larger or smaller portion of the lamination stack depending on the particular application. The illustrated embodiment shows coolant channel 40 positioned in the middle of the lamination stack. However, it is contemplated that the position of the coolant channel 40 be moved depending on assembly, manufacturing, and/or other design considerations.

As can be appreciated from the drawings, the coolant channel 40 is positioned adjacent to only a small portion of the stator core. Therefore, the inner surface of the remainder of motor housing 38 which is adjacent to the stator core defines an enclosure surface 46. Enclosure surface 46 is positioned flush against the back iron 22 of lamination 20.

As depicted, winding teeth 32 are covered on the inside by an insulating liner 48. Insulating liner 48 may be made of a variety of materials, such as, but not limited to, Nomex®, Mylar®, Kapton® or any layered combination of these or other insulating materials.

Figure 7:
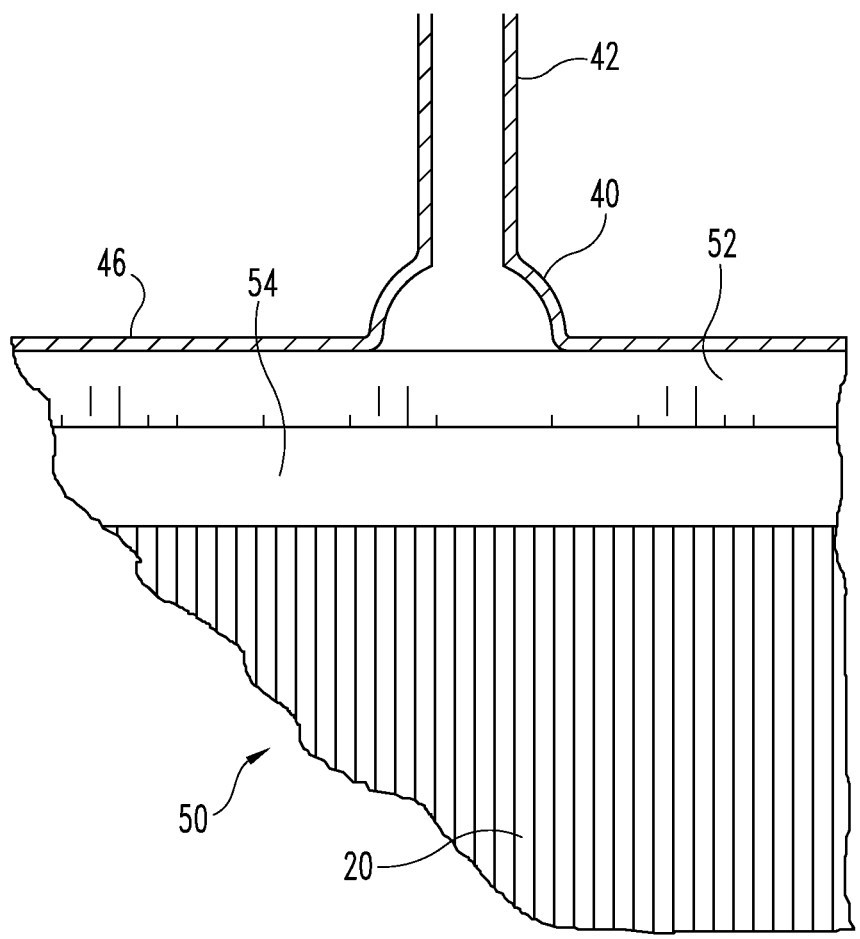
FIG. 7 is a partial cross-sectional view of a motor cooling arrangement taken along line A-A of FIG. 6.

FIG. 7 is a partial cross-sectional view taken along line A-A of FIG. 6. As depicted, a stator core 50 is created when a plurality of laminations 20 are stacked together. The entrance slots 28 of the plurality of laminations 20 align to form an entrance slot passage 52 and cooling holes 30 align to form a coolant passageway 54. Both the entrance slot passage 52 and coolant passageway 54 run along the entire length of stator core 50. Enclosure surface 46 is positioned flush against or closely adjacent to the top of entrance slot passage 52. This arrangement minimizes coolant spill over from the entrance slot passage 52.

Figure 8:
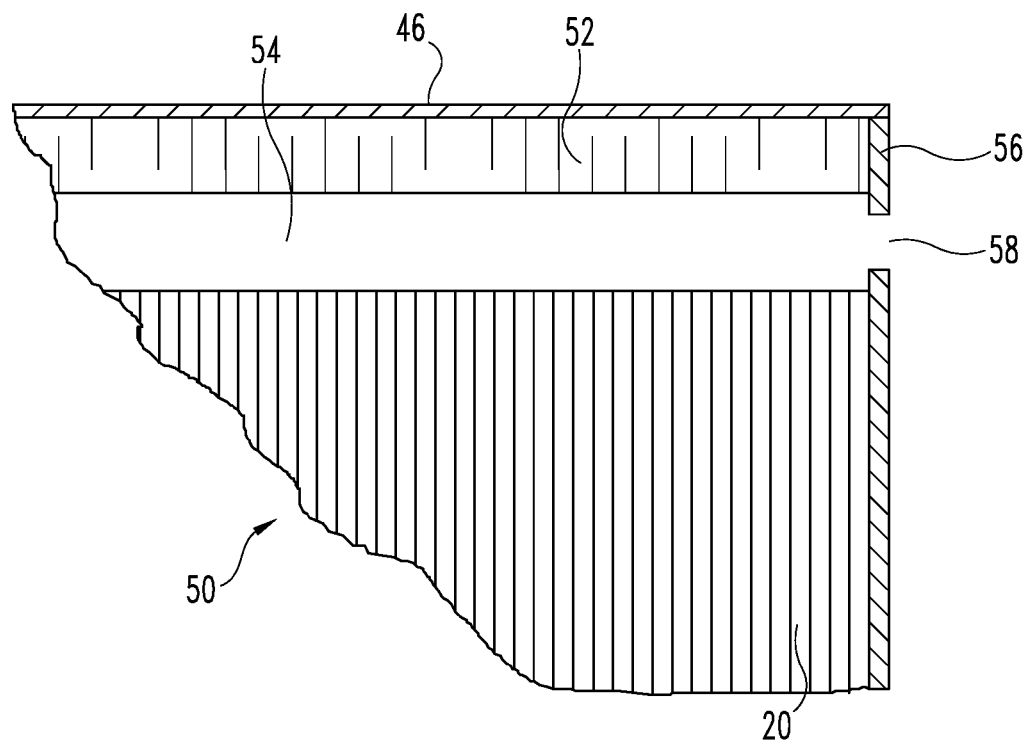
FIG. 8 is a partial cross-sectional side view of one end of the motor cooling arrangement according to one embodiment of the present disclosure.

FIG. 8 depicts a cross-sectional view of one end of the motor cooling arrangement of the present disclosure according to one embodiment of the present disclosure. In this embodiment, an end lamination 56 is provided at the end of stator core 50. The end lamination 56 completely terminates entrance slot passage 52 and partially covers coolant passageway 54. End lamination 56 has an opening 58. In the illustrated embodiment, opening 58 has a diameter less than that of coolant passageway 54. In another embodiment, the opening of end lamination 56 has a diameter equal to that of coolant passageway 54.

Figure 9:
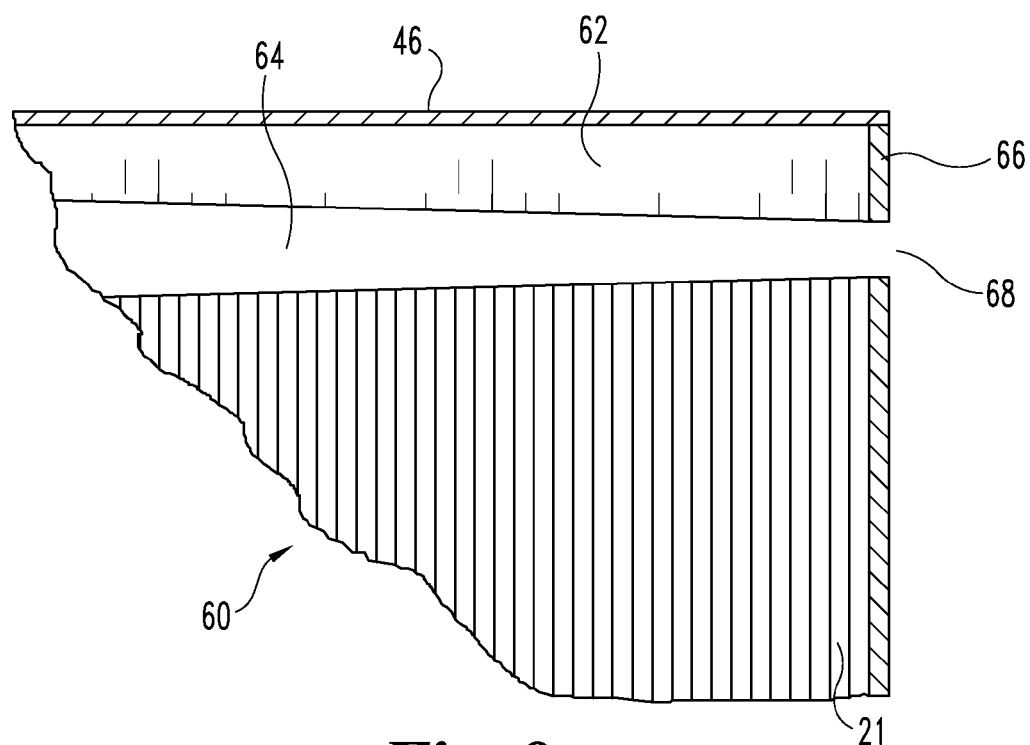
FIG. 9 is a partial cross-sectional side view of one end of the motor cooling arrangement according to an additional embodiment of the present disclosure.

FIG. 9 depicts a cross-sectional view of one end of the motor cooling arrangement of the present disclosure according to a further embodiment. Stator core 60 is created when a plurality of individual laminations 21 are stacked together. Entrance slots 28 align to form an entrance slot passage 62. Similarly, cooling holes 30 of the laminations 21 align to form a coolant passageway 64. Both the entrance slot passage 62 and coolant passageway 64 run along the entire length of stator core 60.

In this embodiment, the diameter of the cooling holes 30 is reduced for each outward lamination 21. As a result, the surfaces defining coolant passageway 64 taper in the direction of end lamination 66. In another embodiment, the diameter of the coolant passageway 64 may decrease in a stepped fashion. For example, the diameter of the cooling hole 30 may be the same for ten consecutive laminations. The next ten laminations may then have cooling holes 30 with a slightly smaller diameter than those of the previous laminations. Each group of laminations would then have a cooling hole 30 diameter smaller than the inwardly adjacent group.

An end lamination 66 is provided at the end of stator core 60. End lamination 66 has an opening 68. End lamination 66 completely terminates entrance slot passage 62. In the depicted embodiment, the opening 68 of end lamination 66 has a diameter equal to that of the end of coolant passageway 64. In another embodiment, end lamination 66 has an opening with a diameter less than that of the end of coolant passageway 64.

Figure 10:
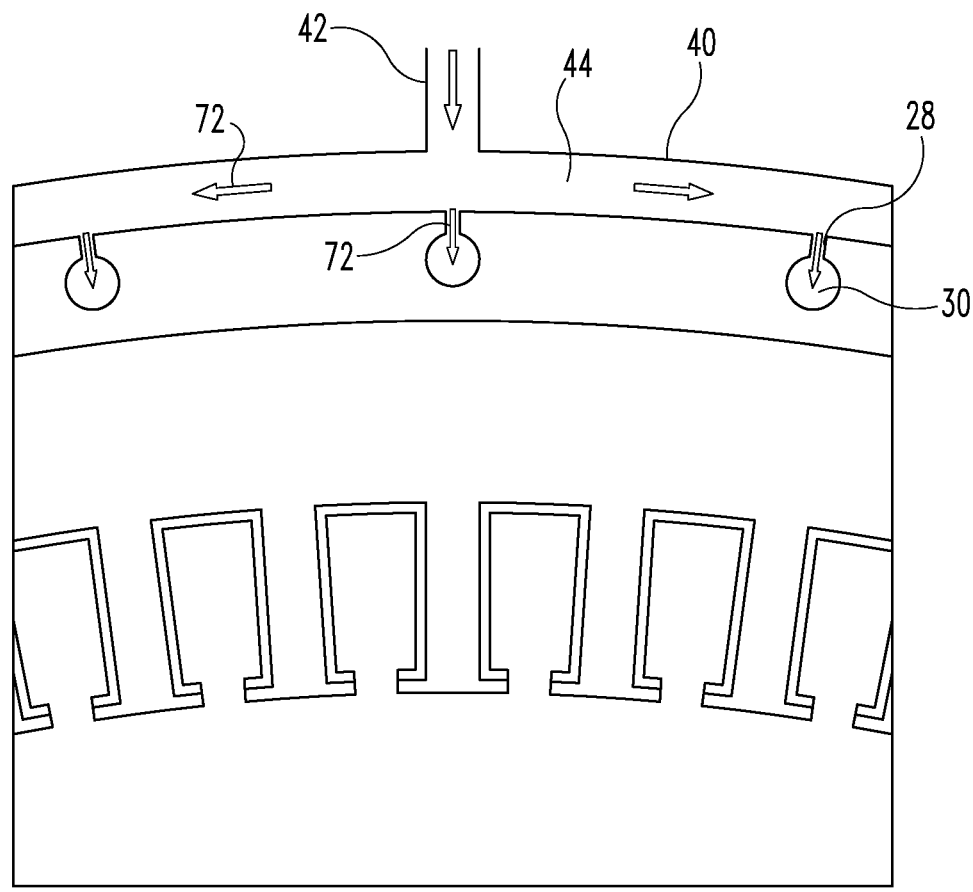
FIG. 10 is a partial cross-sectional end view of the motor cooling arrangement according to one embodiment of the present disclosure.
Figure 11:
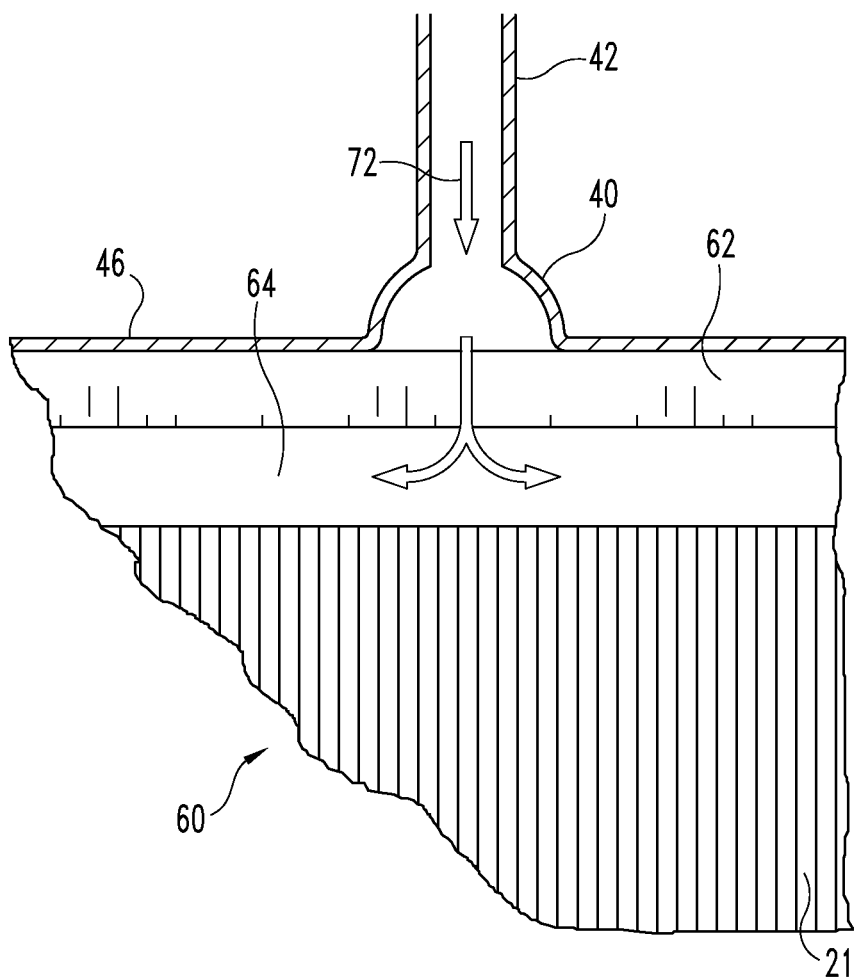
FIG. 11 is a partial cross-sectional side view of the motor cooling arrangement depicting coolant flow according to one embodiment of the present invention.
Figure 12:
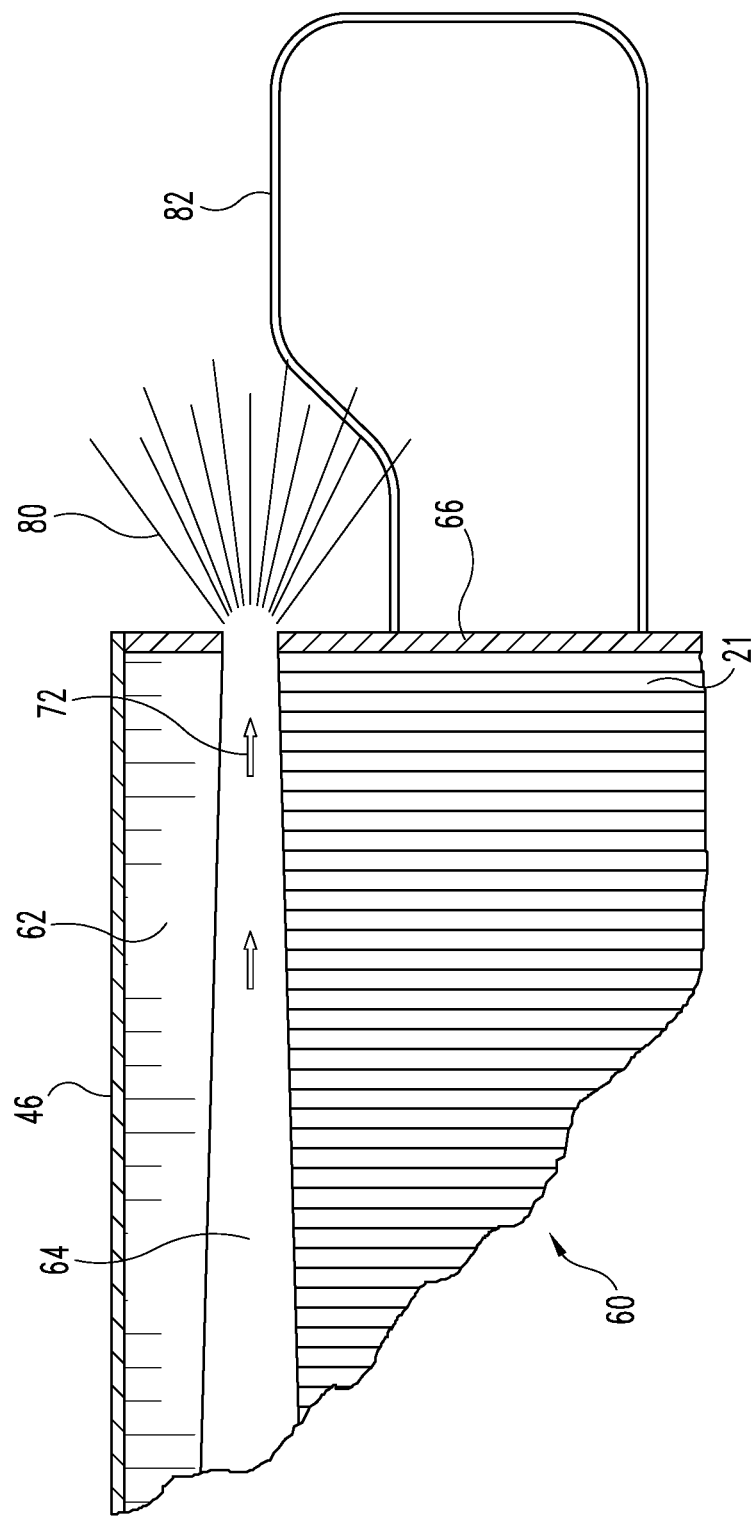
FIG. 12 is a partial cross-sectional side view of the motor cooling arrangement depicting coolant spray onto the stator windings according to one embodiment of the present invention.

With reference to FIGS. 10, 11 and 12, the coolant flows into and through the lamination stack will now be described. As coolant is pumped through the inlet port 42 and into the coolant channel 40, the coolant fills coolant channel 40. The coolant flow is generally represented by arrows 72. According to the illustrated embodiment, the pressurized coolant only flows through the entrance slots 28 and into cooling holes 30 in fluid communication with coolant channel 40. In the shown embodiment, coolant channel 40 is located near the center of the lamination stack.

The pressurized coolant is then directed toward both the front and the rear ends of the stator core 60 via entrance slot passages 62 and coolant passageways 64. As can be appreciated by one of ordinary skill in the art, the coolant absorbs heat from the laminations and assists in the overall cooling of the stator core as it travels through these passages.

As explained hereinabove and according to one embodiment, the diameter of the cooling holes 30 is reduced for each outward lamination. Accordingly, the surfaces defining coolant passageway 64 taper in the direction of end lamination 66. The coolant flow 72 becomes increasingly pressurized as it nears end lamination 66 due to the reduced area of coolant passageway 64. Similarly, entrance slot passage 62 is terminated at end lamination 66. As a result, a coolant spray 80 is created as the coolant flow 72 passes through the opening of end lamination 66. The coolant spray 80 absorbs heat from stator windings 82.

In other embodiments, the opening of the end lamination may be used to facilitation in the creation of coolant spray 80. Looking at the embodiment illustrated in FIG. 8, the walls of coolant passageway 54 do not taper in the outward direction. Instead, the opening of end lamination 56 has a diameter less than the diameter of coolant passageway 54. This small opening will cause the coolant to exit end lamination 56 at a high pressure, as if passing through a nozzle or orifice. This will force the coolant to spray on the stator windings.

In one embodiment, the coolant is only sprayed on the top stator windings 82. In this case, gravity will cause the coolant to flow down through the lower-positioned stator windings, thereby cooling the rest of the stator windings as well.

It should be appreciated that stator 102 and stator windings 82 generate a considerable amount of heat during operation of motor 100. Therefore, these components should be cooled in order to improve the performance and reliability of motor 100. It should further be appreciated that the coolant absorbs heat from the laminations and assists in the overall cooling of the stator core as it travels through the passages provided by the disclosed lamination stack. Additionally, the stator windings 82 are cooled by coolant spray 80. Further, the stator windings positioned at the bottom of the motor housing 38 are also cooled by the accumulated coolant 110 stored in the motor housing 38. Because the heat generated by the stator 102 and stator windings 28 will tend to rise to the top of the motor, the cooling system and method of the present disclosure allows to the coolant to be introduced where the hot spots are located. The E-machine is effectively and efficiently cooled, thereby increasing overall performance.

In the illustrated embodiment, cooling holes 30 have a circular cross-section. However, it is contemplated that cooling holes 30 may be formed in a variety of shapes, such as, but not limited to, circular, oval, square, rectangular, or triangular.

In one embodiment, laminations 20 and 21 are stamped from a sheet type of magnetic material, such as, but not limited to, silicon steel or powder metal.

In the context of this application, the coolant is understood to be a fluid. The fluid may be different types of oil, a non-conductive fluid that is capable of absorbing heat, or any combination of the same.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. It is also contemplated that structures and features embodied in the present examples can be altered, rearranged, substituted, deleted, duplicated, combined and added to each other. The articles "the", "a", and "and" are not necessarily limited to mean only one, but rather are inclusive and open-ended so as to include optionally multiple such elements. All publications, patents, and patent applications cited in this specification are herein incorporated by reference as if each individual publication, patent, or patent application were specifically and individually indicated to be incorporated by reference and set forth in its entirety herein.

What is claimed is:

1. An electric motor comprising:
   a plurality of laminations defining a lamination stack having two ends;
   a motor winding;
   an end lamination positioned at each end of the lamination stack; wherein each lamination has a plurality of apertures located around its periphery, each aperture defining an entrance slot and a cooling hole, the cooling holes of adjacent laminations in the lamination stack are coincident and define at least one first coolant passage running the entire length of the lamination stack, the entrance slots of adjacent laminations in the lamination stack are coincident and define at least one second coolant passage running the entire length of the lamination stack; and
   wherein the entrance slot is positioned radially outward of the cooling hole and the width of the cooling hole is greater than the width of the entrance slot.

2. The electric motor of claim 1, wherein the cooling holes defining the first coolant passage reduce in diameter from the center of the lamination stack toward each end lamination.

3. The electric motor of claim 1, wherein the diameter of the first coolant passage decreases in a stepped fashion from the center of the lamination stack toward each end lamination.

4. The electric motor of claim 1, wherein the diameter of the first coolant passage adjacent to each end lamination is smaller than the diameter of the first coolant passage near the center of the lamination stack.

5. The electric motor of claim 1, wherein the second coolant passage is terminated by each end lamination.

6. The electric motor of claim 1, wherein the diameter of the first coolant passage is uniform throughout the lamination stack and wherein the diameter of the opening of the end lamination is smaller than the diameter of the cooling hole adjacent to the end lamination.

7. The electric motor of claim 1, further comprising:
a rotor rotatable about an axis;
a stator radially spaced from the rotor, the stator comprising the lamination stack and end laminations;
a motor housing enclosing the stator;
a coolant channel in fluid connection with the motor housing, said coolant channel is constructed and arranged to provide a coolant to at least one of the second coolant passages.

8. The electric motor of claim 7, wherein the coolant channel is positioned circumferentially around a portion of the motor housing and axially central relative to the lamination stack, and wherein the motor housing comprises an inlet in fluid connection with the coolant channel.

9. The electric motor of claim 8, wherein the coolant channel extends around less than one half and more than one fourth of the circumference of the motor housing, wherein the coolant channel is positioned axially central relative to the lamination stack, and wherein the coolant channel is in fluid communication with the axially central portion of a plurality of the second cooling channels.

10. The electric motor of claim 1, wherein the diameter of the first coolant passage adjacent to each end lamination is smaller than the diameter of the first coolant passage near the axial center of the lamination stack and wherein the cooling holes defining the first coolant passage reduce in diameter from the axial center of the lamination stack toward each end lamination.

11. A method comprising:
stacking a plurality of laminations to define a lamination stack, wherein each lamination has a plurality of apertures located around its periphery, each aperture defining an entrance slot and a cooling hole, wherein for each lamination the entrance slot is positioned radially outward of the cooling hole and the width of the cooling hole is greater than the width of the entrance slot;
aligning the apertures such that the cooling holes of adjacent laminations in the lamination stack are coincident and define a plurality of first coolant passages running the entire length of the lamination stack and the entrance slot of adjacent laminations in the lamination stack are coincident and define a plurality of second coolant passages running the entire length of the lamination stack; and
positioning an end lamination at each axial end of the lamination stack.

12. The method of claim 11, further comprising enclosing the lamination stack with a housing having a fluid inlet and a coolant channel positioned circumferentially about a portion of the motor housing and axially central relative to the lamination stack.

13. The method of claim 11, further comprising positioning a motor winding adjacent to the end lamination.

14. The method of claim 13, further comprising pumping coolant from the coolant channel into at least one of the second coolant passages, forcing the coolant along the entire length of the lamination stack through the first coolant passage corresponding with the at least one second coolant passage, and spraying the motor winding with the coolant to cool the motor winding.

15. The method of claim 14, further comprising forcing the coolant through a nozzle provided on an end lamination positioned at an axial end of the lamination stack.

16. The method of claim 14, further comprising accumulating coolant at the bottom of a motor housing enclosing the lamination stack.

17. The method of claim 14, wherein the coolant is forced toward both axial ends from the center portion of the lamination stack.

18. The method of claim 14, wherein the coolant is pumped to the center portion of the lamination stack.

19. An electric motor comprising:
a stator including a plurality of laminations defining a lamination stack having two ends, wherein the stator is positioned concentric to a rotation axis;
a rotor rotatable about the rotation axis;
a motor winding;
a motor housing having an outer surface and enclosing the stator;
an end lamination positioned at each end of the lamination stack;
a coolant channel positioned at the surface of the motor housing;
a fluid inlet in fluid communication with the coolant channel;
wherein each lamination has a plurality of apertures located around its periphery, each aperture defining an entrance slot and a cooling hole, wherein the entrance slot is positioned radially outward of the cooling hole relative to the rotation axis and the width of the cooling hole is greater than the width of the entrance slot;
wherein the cooling holes of adjacent laminations in the lamination stack are coincident and define a plurality of first coolant passages running the entire length of the lamination stack and parallel to the rotation axis, wherein the first coolant passages are configured to apply coolant to the motor winding when coolant is applied to the coolant passages, wherein the entrance slots of adjacent laminations in the lamination stack are coincident and define a plurality of second coolant passages running the entire length of the lamination stack and parallel to the rotation axis, and wherein the second coolant passages are terminated by at least one end lamination; and
wherein the coolant channel is positioned circumferentially around a portion of the surface of the motor housing, wherein the coolant channel extends radially beyond the outer surface of the motor housing, wherein the coolant channel extends around less than one half and more than one fourth of the circumference of the motor housing, wherein the coolant channel is substantially concentric to the rotation axis and axially central relative to the lamination stack, and wherein the coolant channel is in fluid communication with the axially central portion of a plurality of the second channels and configured to supply coolant flow toward both axial ends of the second channels.

* * * * *